Patented Nov. 29, 1938

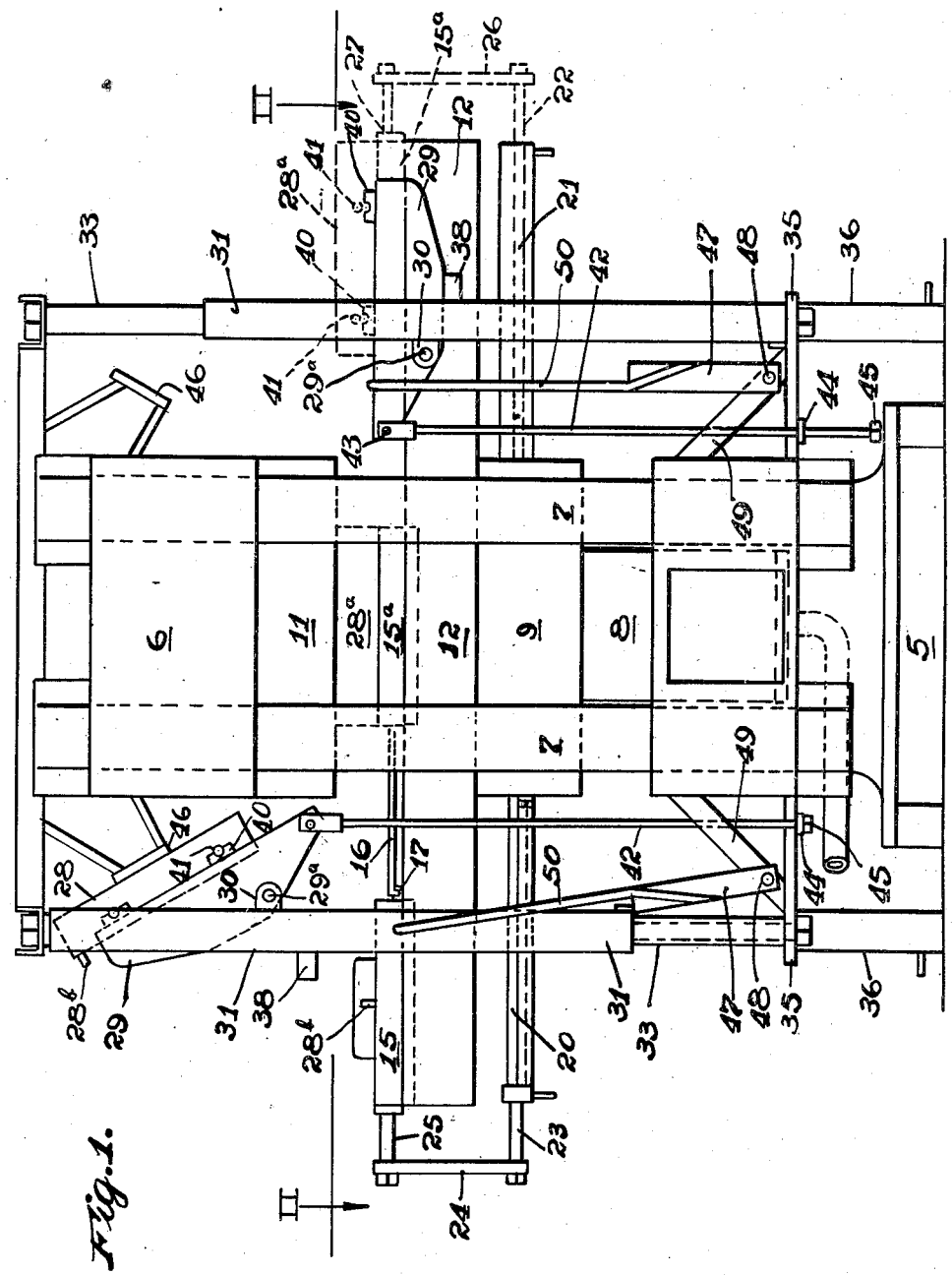

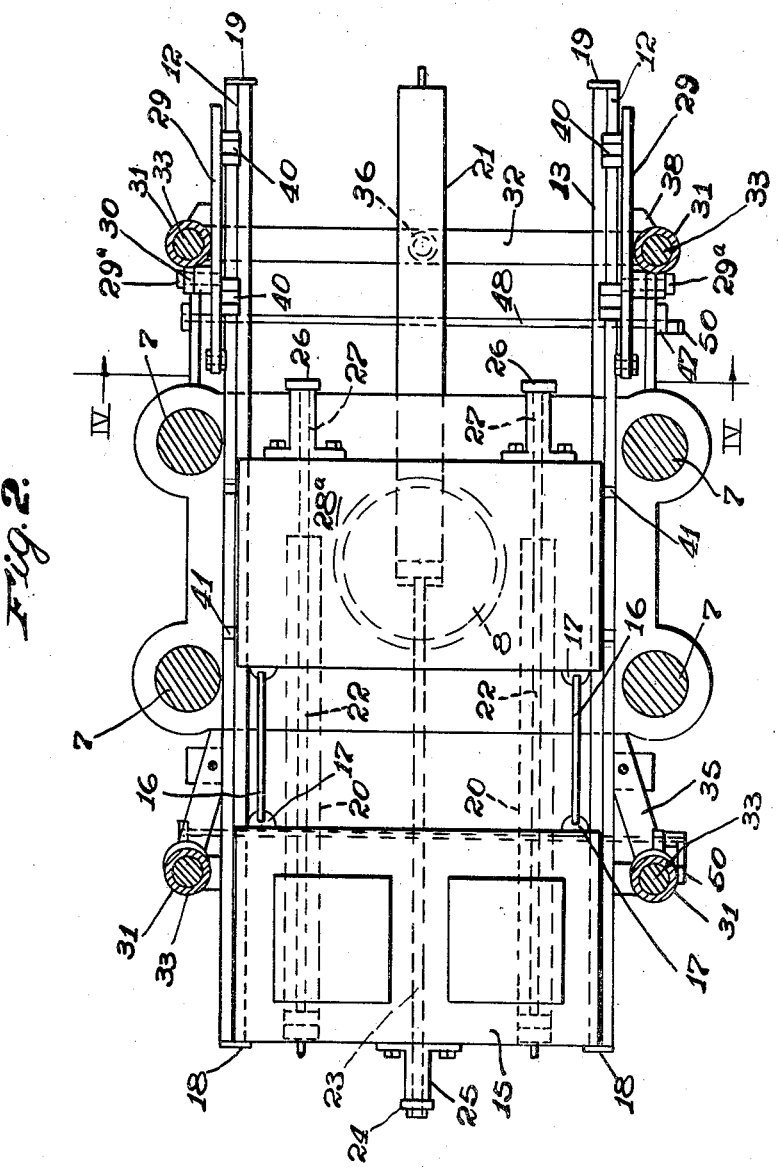

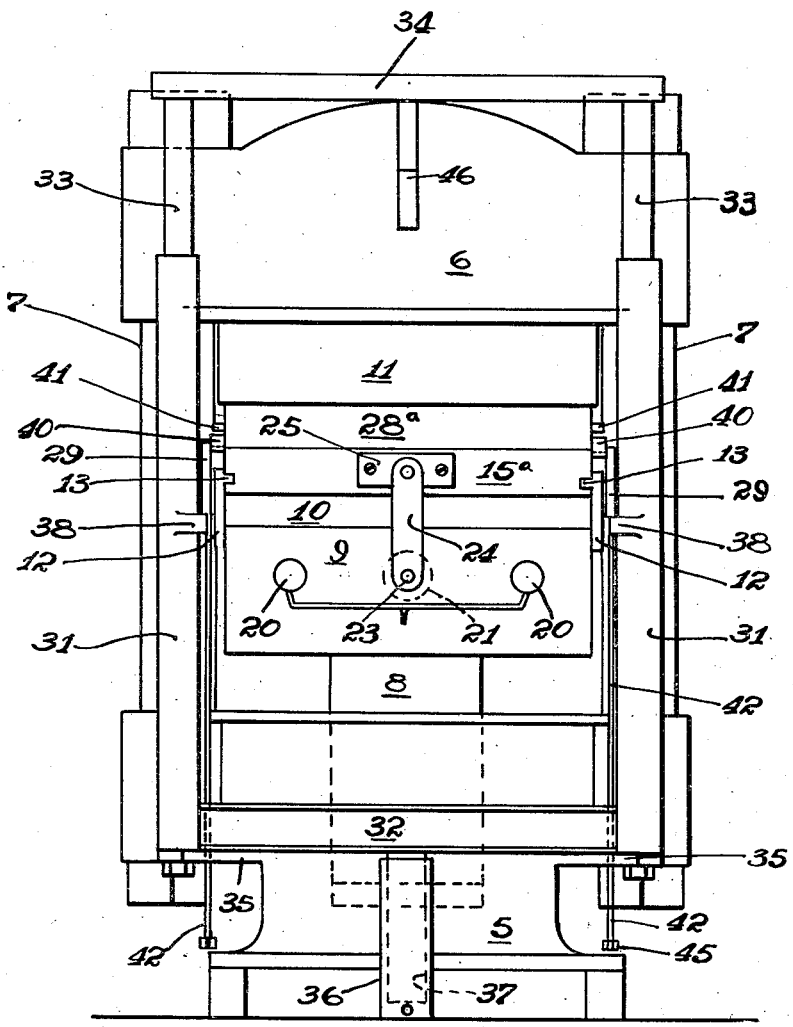

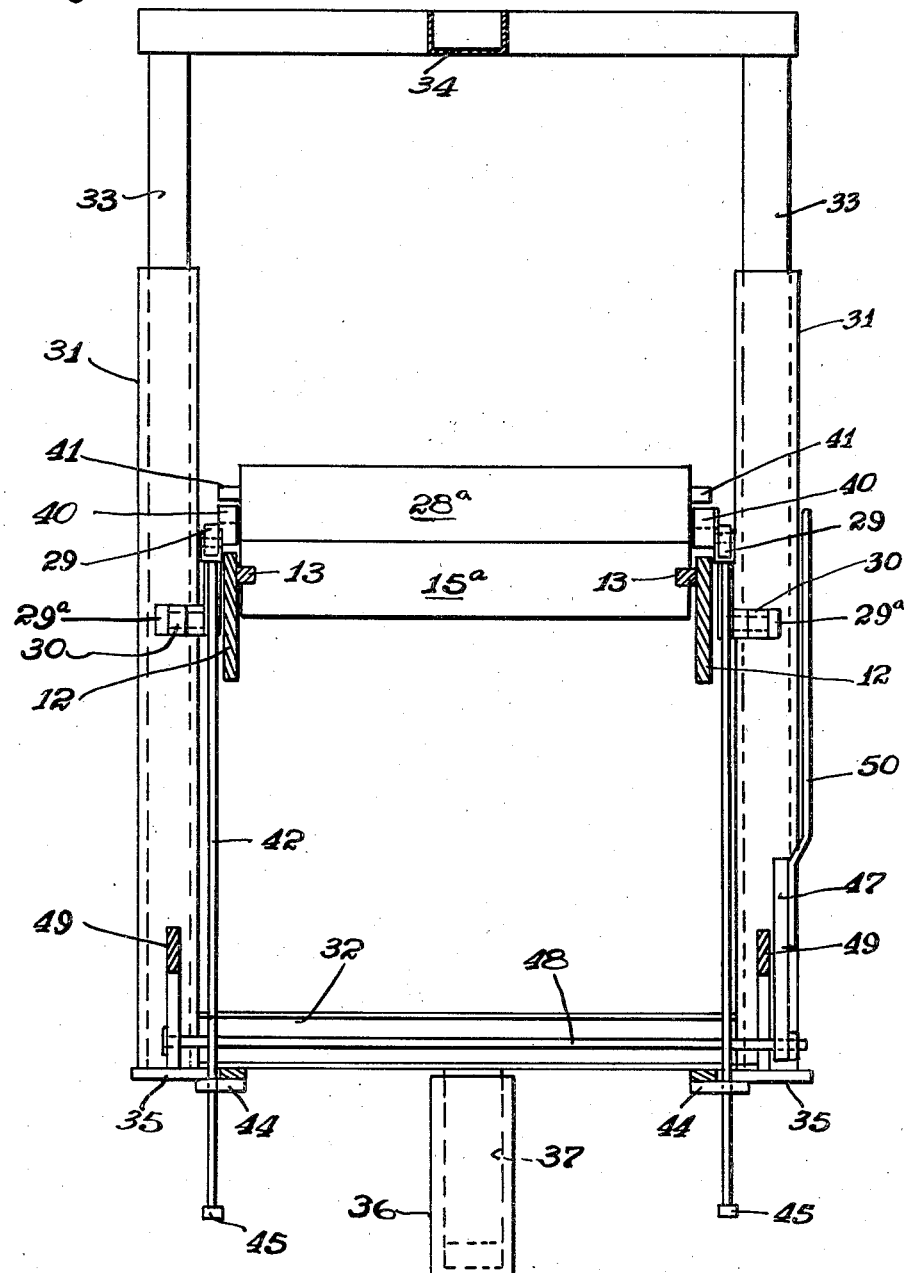

2,138,047

UNITED STATES PATENT OFFICE 2,138,047

PRESS FOR MOLDING ARTICLES

Russell J. Turner, Butler, Pa., assignor to Acme Protection Equipment Company, a corporation of Pennsylvania Application July 14, 1937, Serial No. 153,510

5 Claims. (Cl. 18—17)

This invention relates to a press, preferably operated hydraulically for molding articles requiring heat and pressure, such as those formed from rubber, in which vulcanization occurs during the operation. The invention has for its principal objects the provision of a press of simple construction which can be conveniently operated by one worker to secure a relatively high production. A further object is the provision of a press having improved means for opening the mold to give complete and safe access to the interior thereof and for securing a right line movement of approach and separation of the mold parts in the opening and closing operations. The foregoing and other objects, as will hereafter appear, are achieved by the construction described herein and illustrated in one form in the accompanying drawings, wherein:

Figure 1 is a side elevation. Fig. 2 is a horizontal section on the line II—II of Fig. 1. Fig. 3 is an end elevation. And Fig. 4 is a vertical section on the line IV—IV of Fig. 2.

Briefly stated, the press comprises a pair of opposing presser members, one above the other, and a horizontal guideway, upon which the two part molds are carried and extending out past both sides of the presser members, so that while one mold is engaged by the presser members, the other mold lies in out position, permitting it to be charged during the pressing operation. The molds are connected together, so that when the presser members release the mold therebetween, such mold is moved to out position on the other side of the mold by pushing into position between the members the freshly charged mold. As illustrated, the presser members are steam heated platens for vulcanizing purposes, and the upper of these platens is fixed against vertical movement, the lower platen being carried by a hydraulic plunger. The guide rails, upon which the molds are carried, are fixed with respect to the lower platen, so that they move up and down therewith. It will be understood, in this connection, that the upper platen might be the movable one operated by the hydraulic plunger, in which case, the lower platen is fixed. The molds each consist of a lower or body portion, slidable on the guideways and a lid; and power means are provided at each end of the guideways for lifting the lid to give access to the interior of the molds. This means is so arranged that the lid is first moved bodily in a vertical direction to free it from the body portion, and is then tilted to an angle of about 60 degrees to give good access to the faces of the mold members and the interior of the mold. It will be understood that the press is operated in connection with the formation of rubber articles, in accordance with the technique of the art and depending on the character of the vulcanization, and that suitable connections and valves are used throughout for the steam and pressure supplied, which for the most part are not shown. Preferably two pressures are employed for operating the hydraulic cylinder moving the lower platen, a relatively low pressure to raise the platen and close the press, and a very much higher pressure which is brought into play during vulcanization.

Referring to the drawings, 5 is the base of the machine, suitably mounted on the floor, and 6 is a head which is rigidly secured to the base by the four corner posts 7. Mounted for vertical movement in the base 5 is a hydraulic plunger 8 which carries on its upper end the head 9 and the platen 10. In opposition to this platen is the fixed platen 11 carried by the head 6, both of such platens being provided with the usual cavities to which steam is supplied to give the heat necessary for vulcanization. Secured rigidly to the movable head 9 of the press are the guide rails 12, 12, on which the molds are mounted, as later described. These rails extend out to each side of the body of the machine, as indicated in Fig. 1, so that when a mold is moved to either end, clearance is provided for opening the mold, removing the article formed therein and recharging it. Projecting from the inner face of each rail is a tongue or key 13 welded to the rail and fitting into grooves in the sides of the bottom or body portions 15 and 15a of the molds.

The body portions 15 and 15a of the two molds, are releasably secured together by the pair of links 16 (Figs. 1 and 2) which have downturned ends fitting into the lugs 17 on the body portions. This connection fixes the relative position of the two molds, and forms a part of the means for securing their coordinated movement. When the body portion 15 of one mold is in its loading or unloading position, as shown in Fig. 2, with its ends in contact with suitable stops 18 on the guide rails, the other mold is positioned by the links 16 so that it is centered over the hydraulic plunger 8, and when the pressing operation is completed in the mold above the plunger, and the two molds are moved to the right, so that the mold having the body portion 15a, is carried to the right to unloading position and engages the stops 19, 19 the mold having the body portion 15 is brought to centered position above the plunger 8.

Power means are provided for shifting the molds along the guide rails 12 between the positions as above described, in the form of three hydraulic cylinders 20, 20 and 21 and their plungers 22, 22 and 23 (Fig. 2). The three cylinders are all secured to the base of the machine; the ends of the plungers 22, 22 are secured to the body portion 15a of one mold; and the plunger 23 is secured to the body portion 15 of the other mold. The means for connecting the end of the plunger 23 to the body portion 15, will be seen by reference to Fig. 3 in connection with Figs. 1 and 2, a link 24 being provided between the end of the plunger 23 and the bracket 25 welded or bolted to the body portion 15. Similarly, links 26 and brackets 27 are provided between the ends of the plungers 22 and the mold body portion 15. The combined cross sectional area of the cylinders 20, 20 is equal to the cross sectional area of the cylinder 21, so that the power applied for moving the molds is the same in both directions. When fluid pressure is applied to the cylinders 20 to move the molds in one direction, there is a corresponding exhaust from the cylinder 21, and when pressure is applied to the cylinder 21 to move the molds in the other direction, the exhaust from the cylinders 20, 20 is opened. This method of moving the molds, involving the use of the three hydraulic cylinders, gives a movement of the molds along the guide rails which is free from any binding.

At each end of the guide rails 12 means are provided for lifting the lids 28 and 28a and tilting them to the full line position shown at the left of Fig. 1 (part 28), the dotted line showing at the right of the figure (part 28a), indicating the position of the lid before it is lifted and tilted. The body portion of each mold and its lid are provided with pins 28b fitting into sockets in the opposing mold members to insure matching when the molds are closed, and it is thus necessary in moving the lid to the tilted position shown, to raise the lid bodily, while maintaining it in a horizontal position, until the pins clear the sockets, before the tilting movement occurs. Similarly in returning the lid to closed position, it must first be moved to a horizontal position, and then moved down while maintained in such position, until the closure is completed. The means for accomplishing this result at the two sides of the machine are duplicates, so that a description of one will suffice for both.

The lifting and tilting means comprises a pair of arms 29, 29 pivoted at 29a on brackets 30, 30 welded to the pair of vertical tubes 31, 31, such tubes being secured at their lower ends to the cross beam 32, thus forming a U-shaped framework. The tubes fit slidably upon a guide consisting of the rods 33, 33 tied together at their upper ends by the cross bar 34 and supported at their lower ends upon the brackets 35, 35 rigid with the base 5 of the press. Power means are provided for moving the U-frame comprising the tubes 31, 31 and beam 32 vertically, such means consisting of the hydraulic cylinder 36 carrying the plunger 37 (Fig. 3) secured to the beam 32. When the frame comprising the tubes 31, 31 is in its lower position, as indicated at the right of Fig. 1, the arms 29, 29 are in a horizontal position, being supported in such position by abutments 38 welded to the tubes and projecting beneath the arms. Each arm is provided with a pair of forked blocks 40, 40, which lie just beneath a pair of pins 41, 41, carried by the mold lid 28a when the mold is moved on the guide rails to the dotted line position, this being the extreme position of movement of the mold due to the stops 19 (Fig. 2) at the ends of the rails, heretofore referred to. The lid is thus in position to be lifted from its body portion, when the tubes 31 and the arms 29 carried thereby are moved upward.

The tilting of the arms is accomplished after the tubes 31 and arms 29, have been moved vertically a predetermined distance, by means of lost motion connections in the form of pairs of rods 42 pivoted to the arms at 43 and slidable at their lower ends through brackets 44 carried by the frame of the press. The rods are provided with nuts 45, which engage the brackets after the rods move upward about six inches, as indicated at the left of Fig. 1. When this occurs, the further upward movement of the tubes 31 causes the arms 29 to tilt around their pivots 29a to the position shown, such movement being limited by the stop member 46 carried by the frame of the press. In closing the lid, the first downward movement of the tubes 31 permits the arms and lid carried thereby to swing to a horizontal position so that the arms engage the abutments 38, after which, the arms and lid move down in a horizontal position until the lid is closed and the parts occupy the position at the right of Fig. 1. When the arms and lid are in raised tilted position, a latch 47 (Fig. 1) pivoted on a rod 48 carried by brackets 49 engages the lower end of the tube 31. This latch is provided with a handle 50 for releasing it before hydraulic pressure is released from the cylinder 36 to permit the parts to move down and close the lid. A similar latch is provided on the other side of the machine connected to the pivot rod 48 so that the latches are operated in unison by the handle 50.

The operation of the machine, starting with the parts in the full line position of Fig. 1, is as follows. One mold is now under heat and pressure between the plunger 8 and the head 6, and the other one has its lid 28 in open tilted position, so that a charge of material to be pressed may be inserted in the body portion 15. On releasing the latch 47 by moving the handle 50 to the right and operating the valve which controls the exhaust from the cylinder 36, the U-frame comprising the tubes 31, 31 and the cross beam 32 moves down, thus swinging the arms 29 in a counterclockwise direction until the arms engage the abutments 38 at which time, the arms and lid are horizontal. On a further downward movement of the U-frame, the lid is deposited upon the body portion of the mold. The molds may now be shifted on the rails 12, assuming that the mold 15a, 28a has had sufficient time under heat and pressure between the platens 10 and 11. Pressure is released from the plunger 8, so that it moves down slightly and pressure is admitted to the cylinders 20, 20 and exhausted from the cylinder 21, so that the mold 15a, 28a is moved to the right to the dotted line position of Fig. 1 and the mold 15, 28 is pulled into position above the plunger 8. Pressure is now applied to the mold 15, 28 by the plunger 8, and the mold 15a, 28a which is now in the dotted line position is ready for opening to remove the finished article and recharge while the pressing and vulcanization of the charge in the mold 15a, 28a is under way. The lid 28a is removed and tilted by admitting pressure to the cylinder 36 at the right of the press which moves the U-frame, including the tubes 31, upward carrying with it the arms 29 and the lid 28a supported thereon. When the nuts 45 on the rods 42 engage the brackets 44, the further upward movement of the U-frame causes the arms 29 to tilt around the pivots 29a until the lid engages the stop 46 and the parts occupy a position similar to the corresponding parts as shown at the left of the press. At this time, the latches 47 are swung to the right by the handle 50, so that they engage the lower ends of the tubes 31, thus locking the U-frame and parts carried thereby in elevated position. The pressed article may now be removed from the body portion 15a of the mold and a new charge inserted. From this point on, the cycle of closing the mold and shifting it back to pressing position, while the mold 15a, 28a is shifted to the left to unloading position, will be apparent without further description.

Due to the provision for pressing and vulcanization in one mold, while the other one is being unloaded and recharged, the press has a relatively large output and can be worked to capacity by a single operator. The character of the mold opening is such as to give a large degree of clearance for loading and unloading and good access to the lid for cleaning. The means for supporting the lid in open position, including the hydraulic plunger 37, in conjunction with the latches 47, insure against accidental closing of such lid, making the operation of unloading and charging entirely safe.

What I claim is:

1. In combination in a press, a pair of opposing presser members one above the other, one of which is fixed and the other movable toward and from the fixed member, power means for operating the movable member, horizontal guide means fixed with respect to the lower member lying transversely of the members adjacent the level of the fixed member and extending out past such member on each side thereof, two molds mounted on the guide means for sliding movement and arranged so that either mold may be positioned between the presser members with the other mold lying to one side thereof, each mold consisting of a body portion which engages the guide means and a lid adapted to be moved vertically to open and close the mold, means linking the molds together, operating means for the lids on each side of the presser members each positioned so as to engage the lid of the mold when it is in out position, and means for operating each operating means so as to first move the lid vertically in parallel with the body portion of the mold and then tilt it.

2. In combination in a press, a pair of opposing presser members one above the other, one of which is fixed and the other movable toward and from the fixed member, power means for operating the movable member, horizontal guide means fixed with respect to the lower member lying transversely of the members adjacent the level of the fixed member and extending out past such member on each side thereof, two molds mounted on the guide means for sliding movement and arranged so that either mold may be positioned between the presser members with the other mold lying to one side thereof, each mold consisting of a body portion which engages the guide means and a lid adapted to be moved vertically to open and close the mold, means linking the molds together, operating means for the lids on each side of the presser members each positioned so as to engage the lid of the mold when it is in out position, and means for operating each operating means so as to first move the lid vertically in parallel with the body portion of the mold and then tilt it in opening the lid and adapted in its reverse movement to swing the lid into parallel with the body portion and then lower it onto the body portion while maintained in parallel therewith.

3. In combination in a press, a pair of opposing presser members one above the other, one of which is fixed and the other movable toward and from the fixed member, power means for operating the movable member, horizontal guide means fixed with respect to the lower member lying transversely of the members adjacent the level of the fixed member and extending out past such member on one side thereof, a mold mounted on the guide means for sliding movement and adapted in one position to lie between the presser members and in another position to lie to one side of such members, such mold consisting of a body portion which engages the guide means and a lid which is free from the body portion so that the mold may be opened by moving the lid bodily in a vertical direction, and operating means for lifting the lid when the mold is in out position, such means comprising a pair of arms mounted for bodily vertical movement and also tilting movement and adapted to engage the lid when the mold is in out position, power means for moving the arms vertically to lift the lid while maintaining it in parallel with the body portion, and stop means for the arms which become effective, after the arms have moved vertically a predetermined distance, and act to tilt the arms and lid carried thereby on a further upward movement of the arms.

4. In combination in a press, a pair of opposing presser members one above the other, one of which is fixed and the other movable toward and from the fixed member, power means for operating the movable member, horizontal guide means fixed with respect to the lower member lying transversely of the member on one side thereof, a mold mounted on the guide means for sliding movement and adapted in one position to lie between the presser members and in another position to lie to one side of such members, such mold consisting of a body portion which engages the guide means and a lid which is free from the body portion so that the mold may be opened by moving the lid bodily in a vertical direction, and operating means for lifting the lid comprising a frame to which are pivoted a pair of arms adapted to engage the lid when the mold is in out position, such frame being provided with abutments for limiting the arms from swinging about their pivots to a position below the horizontal, power means for moving the frame upward, so that the arms lift the lid from the body of the mold, and lost motion stop means for the arms which limit the upward movement of the arms on one side of their pivots, so that after such stop means become effective, the further upward movement of the frame tilts the arms and the lid carried thereby.

5. In combination in a press, a pair of opposing presser members one above the other, one of which is fixed and the other movable toward and from the fixed member, power means for operating the movable member, horizontal guide means fixed with respect to the lower member lying transversely of the members adjacent the level of the fixed member and extending out past such member on each side thereof, two molds mounted on the guide means for sliding movement and arranged so that either mold may be positioned between the presser members with the other mold lying to one side thereof, each mold consisting of a body portion which engages the guide means and a lid adapted to be moved vertically to open and close the mold, means for moving the molds along the guides, operating means for the lids on each side of the presser members, each positioned so as to engage the lid of the mold when it is in out position, and means for actuating each operating means so as to first move the lid vertically in parallel with the body portion of the mold and then tilt it.

RUSSELL J. TURNER.